(12) United States Patent
Mayer Pujadas et al.

(10) Patent No.: US 12,128,832 B2
(45) Date of Patent: Oct. 29, 2024

(54) RADOME FOR VEHICLES

(71) Applicant: ZANINI AUTO GRUP, S.A., Parets del Valles (ES)

(72) Inventors: August Mayer Pujadas, Barcelona (ES); Jerson Jair Peralta Morales, Barcelona (ES)

(73) Assignee: Zanini Auto Grup, S.A., Parets del Valles (ES)

( * ) Notice: Subject to any disclaimer, the term of this patent is extended or adjusted under 35 U.S.C. 154(b) by 44 days.

(21) Appl. No.: 17/403,074

(22) Filed: Aug. 16, 2021

(65) Prior Publication Data

US 2022/0048444 A1 Feb. 17, 2022

(30) Foreign Application Priority Data

Aug. 17, 2020 (EP) .................................... 20382755

(51) Int. Cl.

| | |
|---|---|
| *B60R 13/00* | (2006.01) |
| *B60Q 1/26* | (2006.01) |
| *B60Q 1/30* | (2006.01) |
| *F21S 41/141* | (2018.01) |
| *F21S 41/24* | (2018.01) |
| *F21S 41/50* | (2018.01) |
| *H01Q 1/32* | (2006.01) |
| *H01Q 1/42* | (2006.01) |
| *H01Q 1/06* | (2006.01) |

(52) U.S. Cl.
CPC ............. *B60R 13/005* (2013.01); *B60Q 1/26* (2013.01); *B60Q 1/301* (2022.05); *F21S 41/141* (2018.01); *F21S 41/24* (2018.01); *F21S 41/50* (2018.01); *H01Q 1/3233* (2013.01); *H01Q 1/3283* (2013.01); *H01Q 1/422* (2013.01); *H01Q 1/06* (2013.01)

(58) Field of Classification Search
CPC ....... B60R 13/005; F21S 41/50; H01Q 1/422; H01Q 1/06; H01Q 1/3283
See application file for complete search history.

(56) References Cited

U.S. PATENT DOCUMENTS

| | | | |
|---|---|---|---|
| 9,176,256 B2 | 11/2015 | Hall et al. | |
| 2011/0047784 A1* | 3/2011 | Ohtake | G01S 7/03 29/600 |

(Continued)

FOREIGN PATENT DOCUMENTS

| | | |
|---|---|---|
| WO | 2019/130237 A1 | 7/2019 |
| WO | 2020/078916 A2 | 4/2020 |

OTHER PUBLICATIONS

European search report for EP20382755.5, dated Jan. 12, 2021, 6 pages.

*Primary Examiner* — Julie A Bannan

(74) *Attorney, Agent, or Firm* — Danielson Legal LLC (57) ABSTRACT

The radome for vehicles comprises a radio transmissive transparent layer (9) and a decorative element (6), wherein the decorative element (6) comprises a brightness and tone element (62) comprising a metal layer (621) and one or more metalloid layers (622). The brightness and tone element (62) preferably comprises two metalloid layers (622, 623), each metalloid layer being made from a different metalloid.

It permits to provide a radome for vehicles that allows to match a wider range of appearance specifications (brightness and color tone) defined by the car manufacturers.

15 Claims, 12 Drawing Sheets

(56) References Cited

U.S. PATENT DOCUMENTS

| | | | |
|---|---|---|---|
| 2012/0119961 A1* | 5/2012 | Mayer Pujadas | B60R 13/005 |
| | | | 427/455 |
| 2017/0168137 A1* | 6/2017 | Cho | G01S 13/931 |
| 2017/0324157 A1* | 11/2017 | Shurish | H01Q 1/42 |
| 2019/0143909 A1* | 5/2019 | Mayer Pujadas | H01Q 1/3283 |
| | | | 342/70 |
| 2019/0356046 A1* | 11/2019 | Mayer Pujadas | H01Q 1/422 |

* cited by examiner

RADOME FOR VEHICLES

CROSS-REFERENCE TO RELATED APPLICATIONS

The present application claims the benefit of and priority to European Patent Application No. 20382755.5, filed on Aug. 17, 2020, the entire disclosure of which is incorporated by reference as if set forth in its entirety herein.

The present invention refers to a radome for vehicles.

BACKGROUND OF THE INVENTION

The continuing evolution of automotive technology aims to deliver Automated Driving Systems (ADS) through increasing levels of driver assistance defined by the Society Automotive Engineers (SAE) in the coming years. The radomes are a relevant part of these systems since they provide protection to the radars that are used to detect the obstacles on the car's path. At the same time, radomes usually represent the car manufacturer's emblem.

The radomes, seen by an external observer, usually contain colored areas and metal looking ones that, combined, represent the manufacturer's emblem. The metal looking appearance, compatible with high transmission levels of the signal emitted and received by the protected radar, is provided by some bright decorative element held by plastic parts. The car manufacturers are tightening the appearance specifications (brightness and color tone) of the metal looking areas to match the aesthetics of other parts of the car. This is also influencing the selection of suitable metal looking materials, tending to require a precise combination of several of them.

Additionally, the radomes must provide opacity to the electromagnetic signals in the visible range to avoid that any rear light (not proceeding from a possible intended backlit system) might degrade the appearance of the emblem.

The evolution of the different functions is leading to increased requirements for the radomes. They are related, for instance, to better signal transmission performance for newer generation radars, capability of including a backlit system for aesthetical or functional reasons, better matching of metal appearance areas and cost reduction options as consequence of including radars in lower cost car segments.

Therefore, there is the need to improve the materials composition and positioning of these bright decorative elements with respect to the plastic parts to move in the direction of mentioned increased requirements.

Some radomes known in the prior art are the following:

U.S. Pat. No. 6,328,358 B1 discloses a radome with a thin metallic layer comprising indium. Indium, as being one single component, cannot fit all the metallic tones that may be required by different car manufacturers. Since it is a metal with significant electrical conductivity, it can only be used in very thin layers to avoid the degradation of the signal transmission from or to the radar. This thickness is not able to ensure required opacity to visible light, requiring a rear non-transparent plastic part. Additionally, indium shows low resistance to mechanical and chemical stresses.

U.S. Pat. No. 6,184,842 B1 discloses a process for manufacturing a radome for a range warning radar that improves the mechanical and chemical resistance of the metallic layer by covering it with SiO2. Its transparency does not affect to the front appearance of the metallic layer. For the same reason, it is not able to provide back opacity, requiring the existence of a rear non-transparent plastic part.

U.S. Pat. No. 9,114,760 B2 discloses a radome using a metalloid or a nonmetal alloy including at least one metalloid which is deposited on the front face of a rear plastic part. The usage of metalloids, due to its low conductivity, allows thicker thicknesses. However, it has been observed that a relative thick layer of, for instance, germanium may show cracks that would be externally visible and not acceptable from the aesthetic point of view. The fact of being deposited on the rear plastic part implies the need of this rear part and the difficulty to include a light guide for an illuminated radome.

US 2019356046 A1 discloses an illuminated radome. Its decorative element, composed by a metalloid or metalloid alloy, is deposited on the front face of the diffusing substrate that distributes the light in the radome. It has been observed that having opaque layers in contact with these light guides reduces their efficiency. It is preferable to have them on an independent plastic part.

DESCRIPTION OF THE INVENTION

Therefore, one purpose of the present invention is to provide a radome for vehicles that allows to match a wider range of appearance specifications (brightness and color tone) defined by the car manufacturers.

With the radome for vehicles according to the present invention it is possible to solve said drawbacks, providing other advantages that are described below.

The radome for vehicles according to the present invention comprises a radio transmissive transparent layer and a decorative element, and the decorative element comprises a brightness and tone element comprising a metal layer and one or more metalloid layers.

Preferably, the metal layer is proximal with respect to the one or more metalloid layers in the brightness and tone element. Proximal means closer to the external observer.

According to a preferred embodiment, the brightness and tone element comprises two metalloid layers, each metalloid layer being made from a different metalloid.

Preferably, the decorative element also comprises an opacity element comprising one or more metalloid layers, and according to preferred embodiments, the opacity element comprises from one to twelve metalloid layers.

Advantageously, the opacity element comprises more than one metalloid layers, and the metalloid of one metalloid layer is different from the metalloid of the adjacent metalloid layer(s).

According to a preferred embodiment, the metal layer is made from indium, and the metalloid(s) is(are) selected from germanium and silicon.

Also according to a preferred embodiment, the metal layer has a thickness between 5-50 nm, the metalloid layer(s) of the brightness and tone element has(have) a thickness between 4-100 nm, and the metalloid layer(s) of the opacity element has(have) a thickness between 4-250 nm.

Furthermore, the decorative element can also comprise a transparent primer layer placed in a proximal end of the decorative element and a protection layer placed in a distal end of the decorative element.

The radome also comprises preferably a radio transmissive colored layer, comprising opaque and/or translucent zones, the radio transmissive colored layer being placed between the radio transmissive transparent layer and the decorative element.

According to some embodiments, the radome also comprises at least one light source and a light guide, and the decorative element comprises a plurality of gaps for the passage of light.

Advantageously, fixations can be embedded in some opaque zones of the radio transmissive colored layer.

Furthermore, a rear opaque cover can be positioned around the field of view, without invading it, and the bright decorative element can be positioned in front of some external light sources, not included in the radome.

The radome for vehicles according to the present invention provides at least the following advantages:

The combination of a thin layer of metal and a layer of metalloid on the externally visible side of the decorative element allows to match a wider range of appearance specifications (brightness and color tone) defined by the car manufacturers.

The usage of several layers of two different metalloids with opposite internal stresses allows to achieve the layer thickness that provides the required level of opacity (depending on the configuration of the radome), without causing cracking of the decorative element.

The usage of an opacity element with metalloids avoids the need of using opaque varnishes, which opaque pigments use to have non-adequate properties for radar signal transmission.

The positioning of the decorative element on the distal face of the front plastic part eases backlit options.

The higher level of mechanical and chemical resistance combined with opacity of the proposed decorative element allows not to use a rear plastic part or reducing it to a contour out of the field of view, reducing cost and improving the radar antenna signal transmission.

BRIEF DESCRIPTION OF THE DRAWINGS

For a better understanding the above explanation and for the sole purpose of providing an example, some non-limiting drawings are included that schematically depict a practical embodiment.

DESCRIPTION OF PREFERRED EMBODIMENTS

Figure 1:
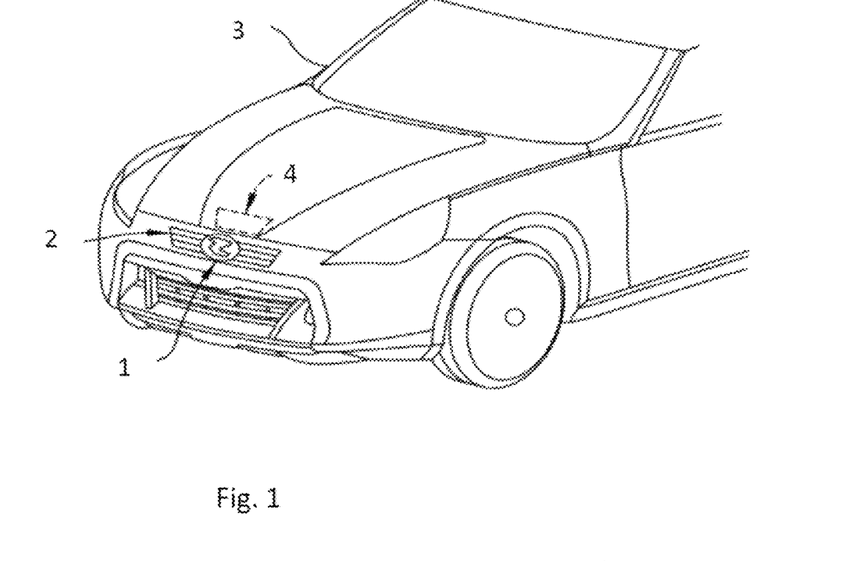
FIG. 1 is a fragmentary isometric view of a vehicle having a radome according to the present invention positioned within a grill assembly and a radar antenna positioned behind the radome.

With reference now in detail to the drawings, wherein like numerals will be employed to denote like components throughout, as illustrated in FIG. 1, reference numeral 1 denotes generally a radome according to the present invention configured for mounting within a grill assembly 2 of a motor vehicle 3.

Positioned within the vehicle 3 behind and in registration with the decorative radome 1 is a radar antenna 4.

Figure 2:
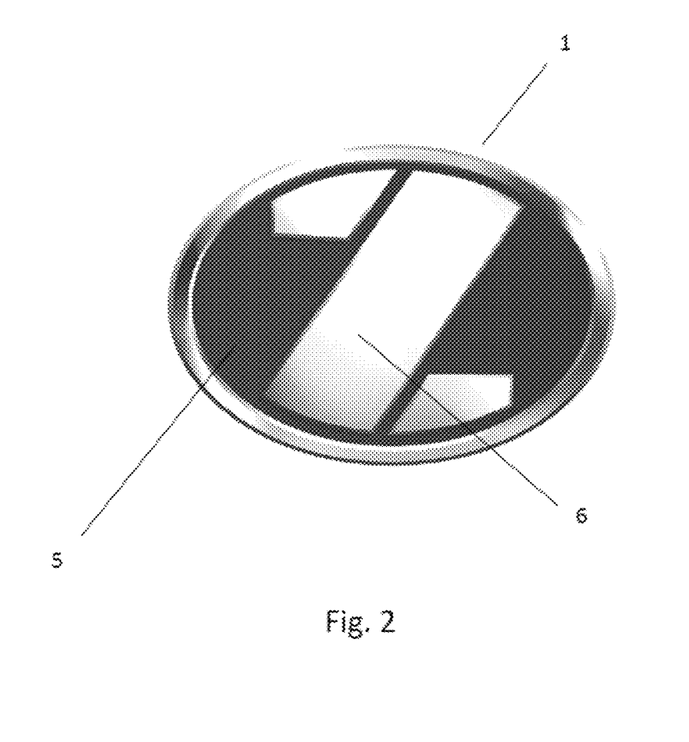
FIG. 2 is a front view of the radome according to the present invention, where a manufacturer's emblem may be identified by contrast of colored and bright areas.

FIG. 2 shows a front view of the radome 1, where it is visible a radio transmissive colored layer 5 and a bright decorative element 6 that provides the metal looking appearance while keeping high transmittance performance for the signal emitted and received by the protected radar antenna 4.

Figure 3:
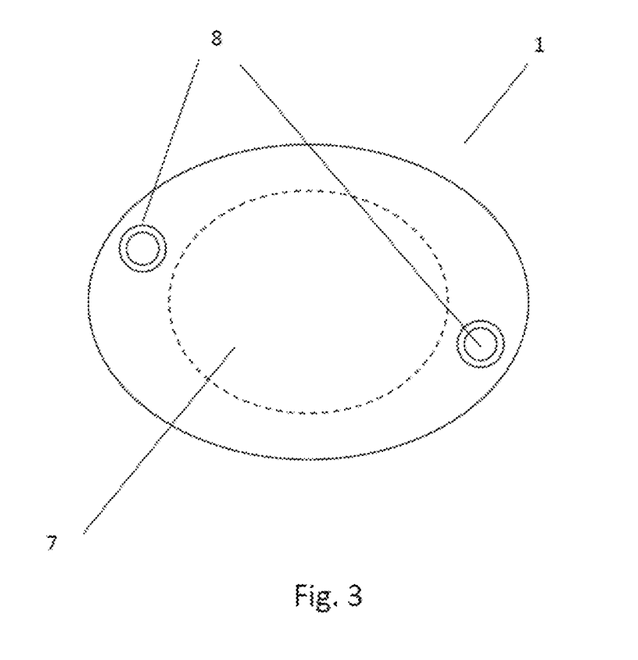
FIG. 3 is a general rear view of the radome according to the present invention.

It can be seen on FIG. 3 the field of view area 7 defined by the zone within the discontinuous lines. The transmission performances required by the radar antenna 4 must be provided within this area of the radome 1. Out of this area, the radome 1 does not have these strict transmission requirements and may include the fixations 8 to the grill assembly 2 (or to other parts of the car) or other not shown devices like connectors for lighting or heating purposes.

Figure 4:
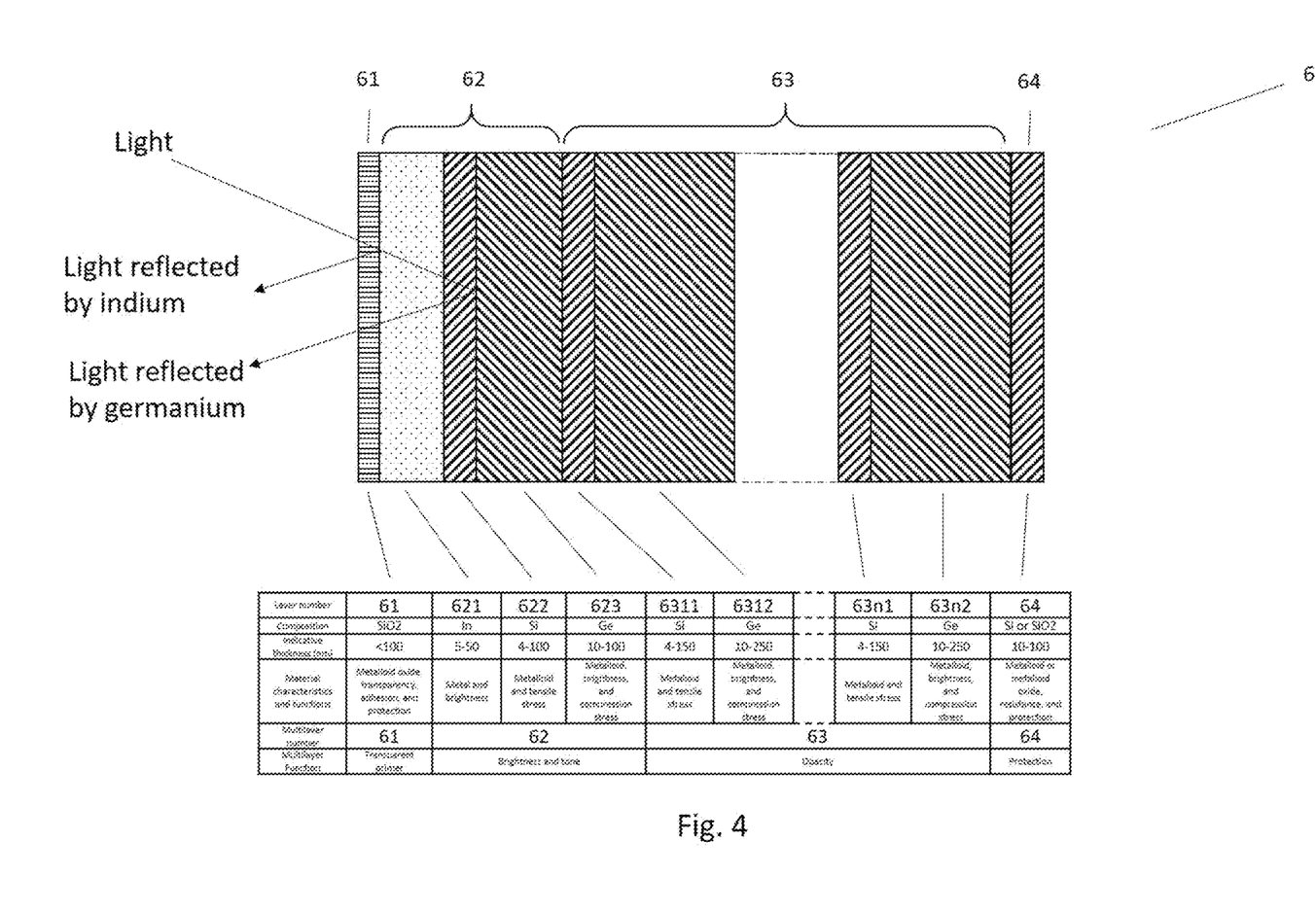
FIG. 4 is as scheme showing the structure and composition of the bright decorative element of the radome according to the present invention.

FIG. 4 shows a section of the bright decorative element 6 with its detailed configuration. Describing it from the proximal face (closer to the external observer, at the left in this figure) to the distal face (closer to the radar antenna, at the right in this figure), it has a first transparent primer layer 61, a brightness and tone element 62 and, optionally, one opacity element (63) with from one (6311) to several (63n2, with n up to 6) metalloid layers depending on required opacity and a protection layer 64 against chemical and mechanical aggressions.

The primer layer 61 has the function of improving the adhesion of the decorative element 6 to the front radio transmissive transparent layer 9 and to the radio transmissive opaque layer 5 described later. A thin layer of SiO2 is used because of its adhesion, transparency to visible light and inert characteristics. Its thickness is below 100 nm and a proven indicative thickness is 4 nm.

The brightness and tone element 62 has the function to provide the metal looking aspect of the emblem with the brightness and color tone specified by the car manufacturer.

This brightness and tone element 62 is formed by successive following layers: indium layer 621, silicon layer 622 and germanium layer 623, according to a preferred embodiment.

Indium 621 provides a high level of brightness, reflecting part of the incident visible light. It is a thin layer to avoid that a thicker layer of an electrically conductive metal like indium would degrade the transmittance capabilities of the radar antenna signal as described in prior art. It is also thin to allow that a part of the incident light reaches and is reflected by the germanium layer 623.

The combination of reflected light at indium layer 621 and at germanium layer 623 provides the brightness and color tone specified by the car manufacturer. Thereby, different combinations of thickness of indium layer 621 and germanium layer 623 will provide different brightness and color tone.

The thickness of indium layer 621 is between 5 and 50 nm and a proven indicative value is 30 nm. The thickness of germanium layer 623 is between 10 and 100 nm and a proven indicative value is 75 nm. Silicon layer 622 located between indium layer 621 and germanium layer 623 isolates the layers of materials where it is interposed, avoiding migrations between them. When deposited in a thin layer, it allows the light to hit and reflect from the germanium layer. The thickness of silicon layer 622 is between 4 and 100 nm and a proven indicative value is 10 nm.

The opacity element 63 has the function to provide some level of opacity. Since germanium is a metalloid, it does not significantly degrade the radar antenna signal transmission, as described in prior art. Used in thick layers, it may be used to provide opacity. However, deposited germanium layers generate some internal compressive stress.

It has been observed that, when some cracking threshold stress is achieved, some cracks appear on the germanium layer which are visible to an external observer, not being acceptable to meet the high aesthetical requirements for a customer's emblem. This cracking threshold stress is achieved in the region of 250 nm to 750 nm of germanium thickness, which would provide some of the required levels of opacity.

Figure 5:
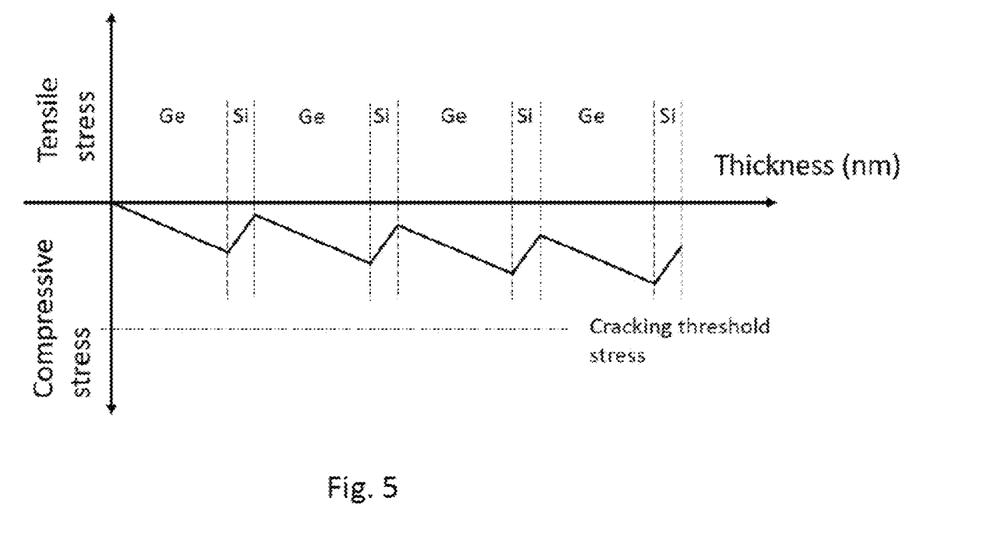
FIG. 5 is a graph showing the stresses caused by the metalloid layers that form the opacity element.

Deposited silicon is characterized by generating some internal tensile stress. It has been observed that using silicon alternated with germanium layers have the effect of compensating stresses, as shown on FIG. 5.

The present invention proposes to optionally use one opacity element (63) with from one (6311) to several (63n2, with n up to 6) metalloid layers depending on required opacity.

The metalloid layers of opacity element 63 are alternatively composed of silicon and germanium.

The thickness of silicon layer 6311 is between 4 and 150 nm and a proven indicative value is 10 nm. The thickness of germanium layer 6312 is between 10 and 250 nm and a proven indicative value is 125 nm. Same limits and proven indicative values apply to the other metalloid layers of the same composition.

Figure 6:
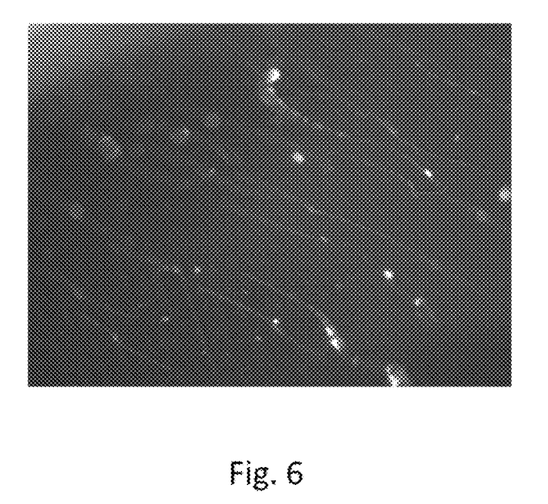
FIG. 6 is a photography of the cracks caused by an excessive thickness of germanium deposited on a layer.
Figure 7:
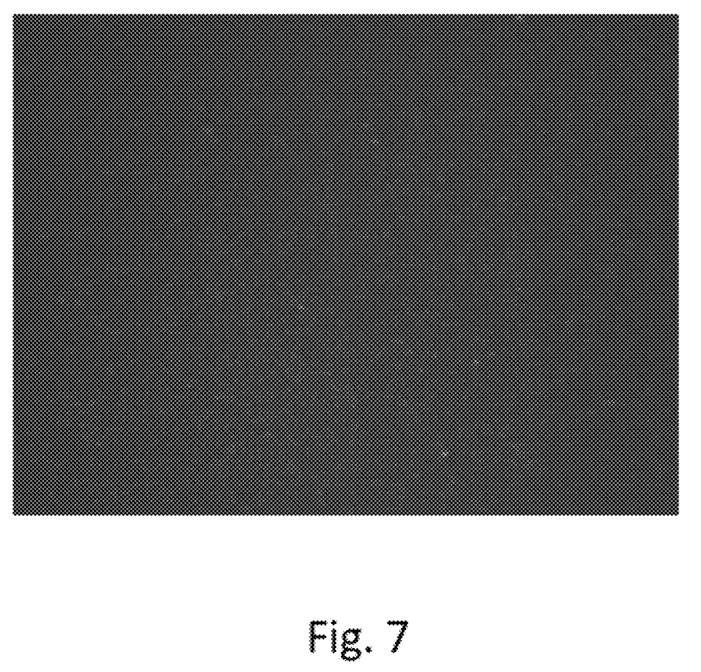
FIG. 7 is a photography where the opacity metalloids layers of the radome according to the present invention show no cracks.

FIG. 6 shows a photograph of a radome with one layer of germanium with a thickness of 500 nm, where it can be observed the existence of cracks that are visible at naked eye. FIG. 7 shows a photograph of a radome with the proposed solution alternating layers of germanium and silicon. This sample has 6 layers of germanium with a total thickness of 750 nm and no crack is visible.

A last protection layer 64 of Si or SiO2 is used to protect the last layer of Ge. Its function is to provide mechanical and chemical protection. Its thickness is between 10 and 100 nm and a proven indicative value is 30 nm.

The thin and controlled thickness layers may be deposited by a Physical Vapor Deposition (PVD) magnetron sputtering process or by a Plasma Enhanced Chemical Vapor Deposition (PECVD) process, depending on the composition of the layer.

Figure 8:
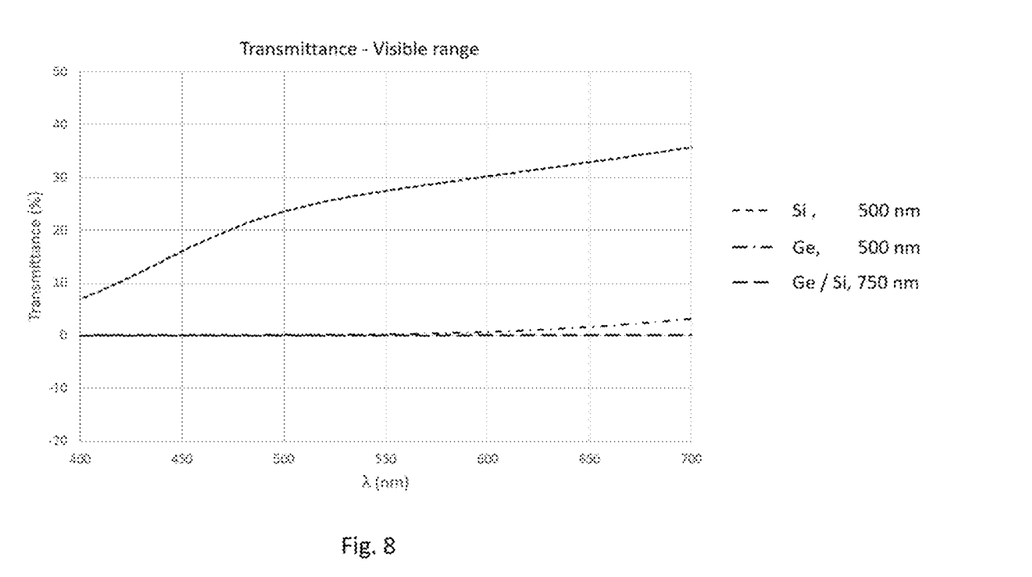
FIG. 8 is a graph showing the different levels of transmittance to visible light offered by different configurations of bright decorative elements.

FIG. 8 shows the different levels of transmittance to visible light offered by different configurations of bright decorative elements. It may be seen that silicon, by itself, is not good to achieve opacity since it shows high levels of transmittance. It is also seen that thicknesses of 500 nm of germanium provides good opacity levels with just about 4% transmittance at wavelength of 700 nm. However, this option causes cracks as seen of FIG. 6. The graph also shows the proposed solution combining alternate layers of germanium and silicon. A thickness of 750 nm offers full opacity (transmittance very close to zero for the whole visible range) while no cracks are visible, as seen on FIG. 7.

The proposed solution of a bright decorative element 6 with the separated functions of appearance and opacity (with adjustable levels of opacity) and positioned on the distal face of the plastic front cover, allow its adoption on several embodiments described here below.

Now several embodiments of the radome according to the present invention are described.

Embodiment 1

In the following, a first embodiment of the radome with layered metal and metalloids is described with reference to FIG. 9. The radome 1 has a front radio transmissive transparent layer 9, positioned on the outer side of the radome, closer to an external observer. It may be made of a plastic resin like polycarbonate (PC) and covers entirely the front face of the radome.

The distal face (closer to the radar) of the front radio transmissive transparent layer 9 is partially covered by a radio transmissive colored layer 5, as also shown on FIG. 4, that may be formed by opaque zones 51 to the visible light and translucent zones 52 to the visible light. It may be made with a similar colored plastic resin like polycarbonate (PC), maintaining a high degree of transmission of the signal emitted and received by the protected radar, quite close to the ones of the transparent layer 9. Alternatively, it may consist of a decorative ink overlaying parts of the distal face of the front radio transmissive transparent layer 9.

Figure 9:
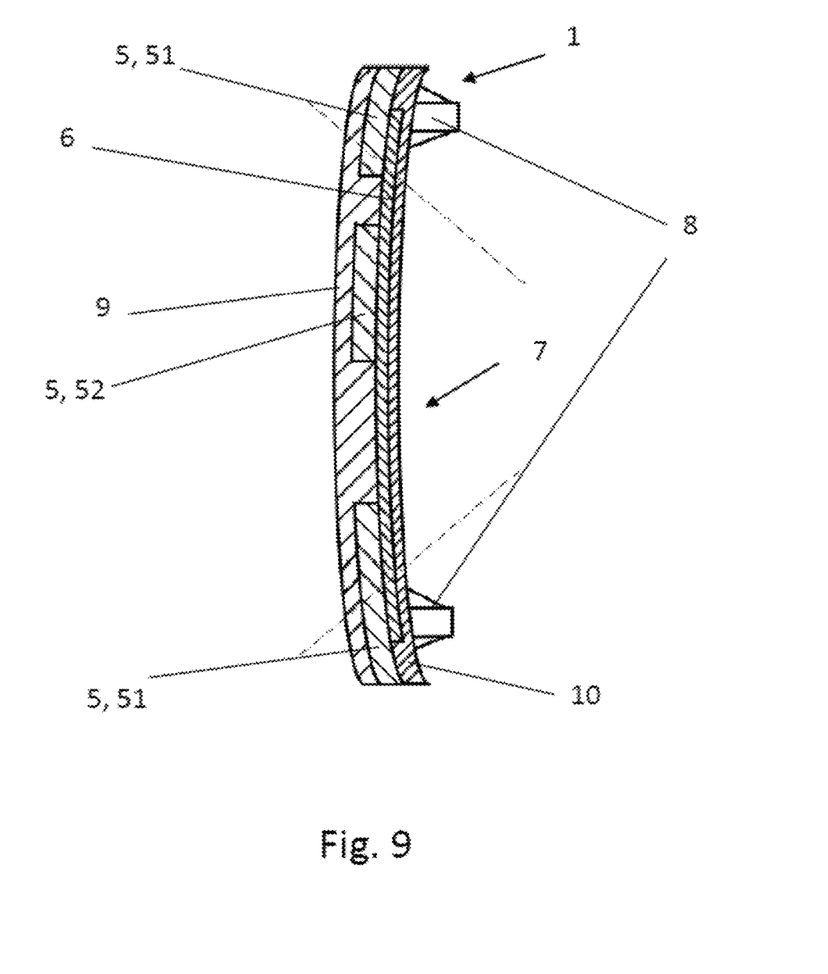
FIG. 9 shows a first embodiment of the radome for vehicles according to the present invention.

A bright decorative element 6, as described on FIG. 4, is positioned on the distal face of the set consisting of front radio transmissive transparent layer 9 and radio transmissive colored layer 5, covering it totally or partially, as shown on FIG. 9.

In case of severe mechanical or corrosion requirements, a hard coating consisting of a varnish may be applied on the proximal and or distal faces of the set of layers described until now, as already well known in the state of the art.

A rear opaque cover 10 is positioned on the side of the radome facing towards the radar. It includes the fixations 8, located out of field of view area 7.

This rear opaque cover 10 provides enough opacity to visible light, making optional the need of opacity element 63. It is made with a plastic material, compatible with the transmission of radar antenna signals, that may be different of the front layers, like a blend of Polycarbonate and Acrylonitrile Butadiene Styrene (PC/ABS), which shows better chemical resistance and good mechanical properties for its fixation purposes.

The thickness of each plastic layer may vary within the field of view area 7 but the total thickness of the group of plastic layers is adapted to the mill metric wave semi wavelength, resulting in a lower attenuation for the radar waves.

The present embodiment takes advantage of the combination of metal and metalloids of the brightness and tone element 62 to match the aesthetic requirements for the car manufacturer emblem.

Embodiment 2

Figure 10:
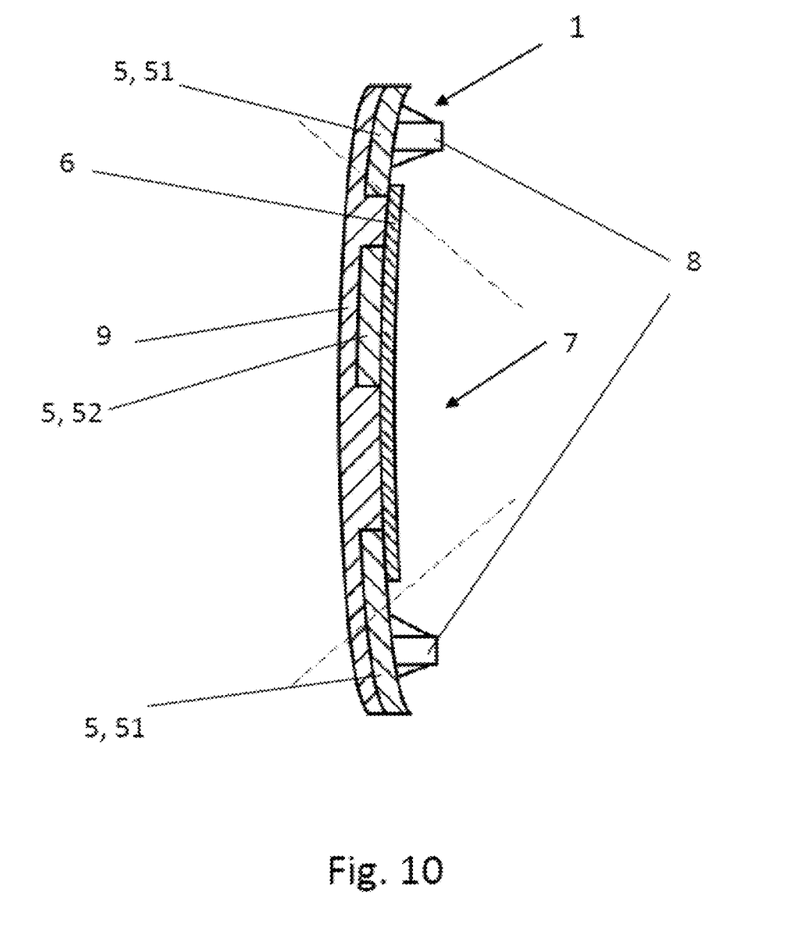
FIG. 10 shows a second embodiment of the radome for vehicles according to the present invention.

In the following, a second embodiment is described with reference to FIG. 10. In the second embodiment, identical reference numerals are given to the components that are quite similar to the corresponding components of the first embodiment and redundant description is omitted therein.

In this second embodiment, the bright decorative element 6, as described on FIG. 4, is also positioned on the distal face of the set consisting of front radio transmissive transparent layer 9 and radio transmissive colored layer 5. In this case, the bright decorative element 6 can only cover partially the distal face of the mentioned set. This allows that some parts of the radio transmissive opaque layer 5 directly include the fixations 8, which are embedded in, out of field of view area 7. In this case, it is avoided the need of a rear opaque cover 10 with its associated cost.

In case of severe mechanical or corrosion requirements, a hard coating consisting of a varnish may be applied on the proximal and or distal faces of the set of layers described until now, as already well known in the state of the art.

The present embodiment uses a bright decorative element 6 with an opacity element 63 with a small number of metalloid layers (6311 to 63n2, with n up to 6) that is enough to avoid that any usual (not added on purpose for radome appearance) ambient light existing behind the radome may affect to the appearance of the emblem when seen by an external observer.

This design minimizes the number of resin layers in the field of view area 7, allowing to obtain superior transmission performances of the signal emitted and received by the protected radar antenna 4.

Embodiment 3

Figure 11:
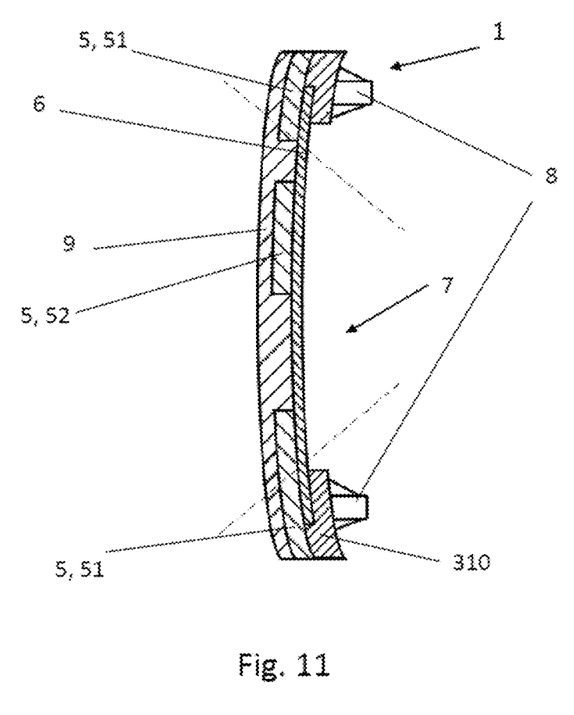
FIG. 11 shows a third embodiment of the radome for vehicles according to the present invention.

In the following, a third embodiment is described with reference to FIG. 11. In the third embodiment, identical reference numerals are given to the components that are quite similar to the corresponding components of the first embodiment and redundant description is omitted therein. Reference numerals **3\*\***, which are obtained by adding 300 to the reference numerals of the components of the first embodiment, are given to the components that correspond to the components of the first embodiment.

In this third embodiment, the bright decorative element 6, as described on FIG. 4, is also positioned on the distal face of the set consisting of front radio transmissive transparent layer 9 and radio transmissive colored layer 5. In this case, the bright decorative element 6 may cover totally or partially the distal face of the mentioned set.

The present embodiment uses a bright decorative element 6 with an opacity element 63 with a small number of metalloid layers (6311 to 63n2, with n up to 6) that is enough to avoid that any usual (not added on purpose for radome appearance) ambient light existing behind the radome may affect to the appearance of the emblem when seen by an external observer.

In case of severe mechanical or corrosion requirements, a hard coating consisting of a varnish may be applied on the proximal and or distal faces of the set of layers described until now, as already well known in the state of the art.

The rear opaque cover 310 is positioned on the side of the radome facing towards the radar and may have an annular like design, continuous or discontinuous, around the field of view 7, without invading it. It includes the fixations 8. This design maintains the minimized number of resin layers in the field of view area 7, allowing to obtain superior transmission performances of the signal emitted and received by the protected radar antenna 4. At the same time, it provides more freedom for the material selection of the fixations 8, which is not limited by radio transmission requirements.

Embodiment 4

Figure 12:
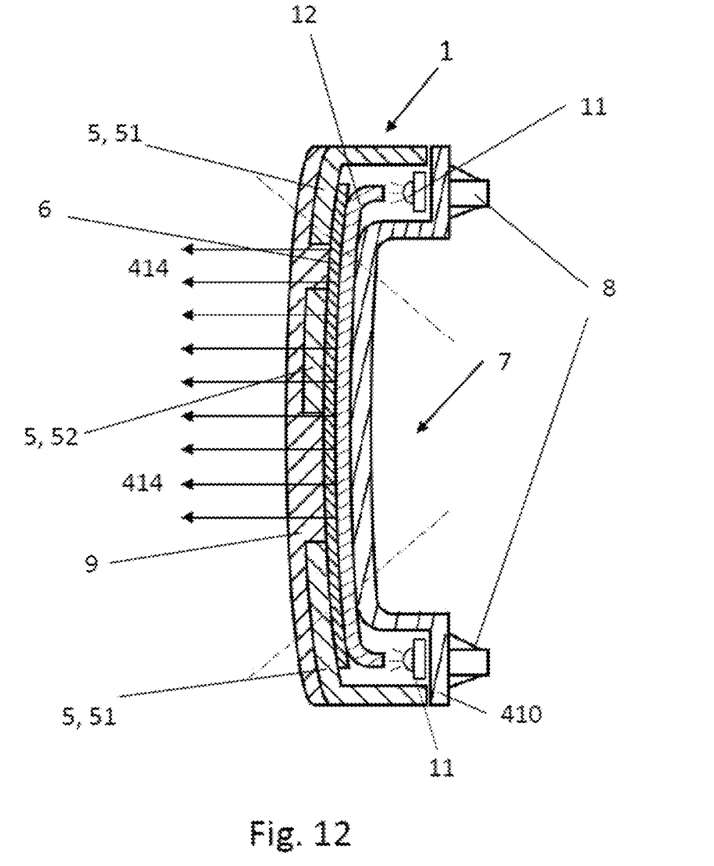
FIG. 12 shows a fourth embodiment of the radome for vehicles according to the present invention.

In the following, a fourth embodiment is described with reference to FIG. 12. In the fourth embodiment, identical reference numerals are given to the components that are quite similar to the corresponding components of the first embodiment and redundant description is omitted therein. Reference numerals **4\*\***, which are obtained by adding 400 to the reference numerals of the components of the first embodiment, are given to the components that correspond to the components of the first embodiment or are assigned to components with some specific characteristic corresponding to fourth embodiment.

In this fourth embodiment, the bright decorative element 6, as described on FIG. 4, is also positioned on the distal face of the set consisting of front radio transmissive transparent layer 9 and radio transmissive colored layer 5. In this case, the bright decorative element 6 may cover totally or partially the distal face of the mentioned set.

In case of severe mechanical or corrosion requirements, a hard coating consisting of a varnish may be applied on the proximal and or distal faces of the set of layers described until now, as already well known in the state of the art.

The radome described in fourth embodiment comprises some internal light sources 11 that can take the form of LEDs or any other suitable light source in terms of intensity and color. The light emitted by the internal light sources 11 is introduced into and guided by an internal light guide 12. The projected light 414 crosses the bright decorative element 6, the translucent zones 52 of the radio transmissive colored layer 5 and the radio transmissive transparent layer 9. This is possible because the present embodiment uses a bright decorative element 6 with no opacity element 63, having a translucent behavior.

The rear opaque cover 410 is positioned on the side of the radome facing towards the radar. It includes the fixations 8, located out of field of view area 7.

The thickness of each plastic layer may vary within the field of view area 7 but the total thickness of the group of plastic layers is adapted to the mill metric wave semi wavelength, resulting in a lower attenuation for the radar waves.

Embodiment 5

Figure 13:
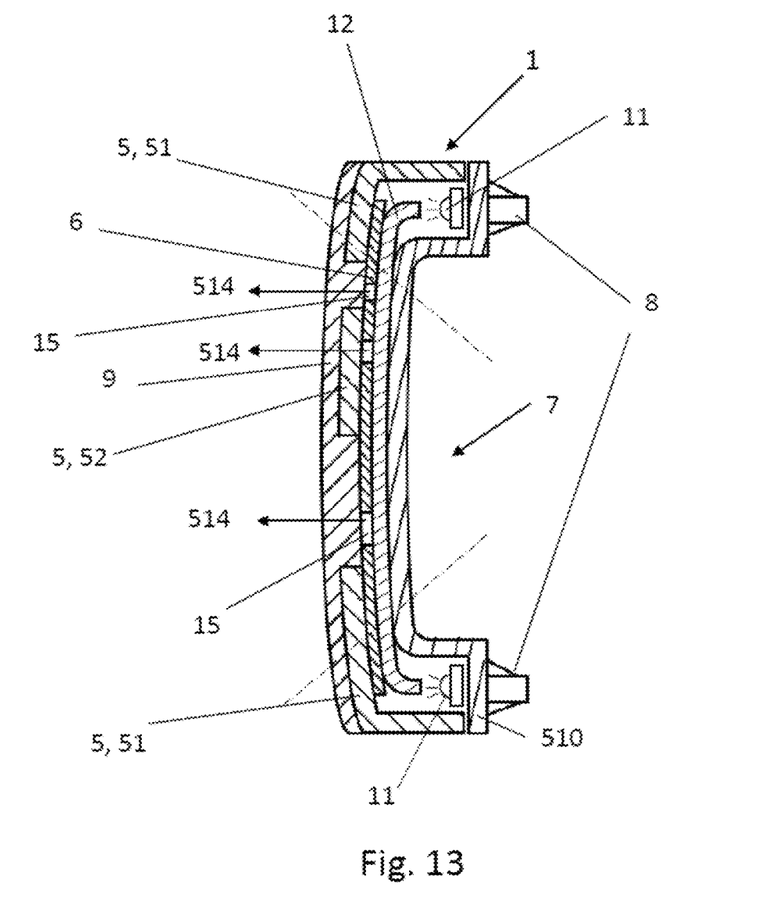
FIG. 13 shows a fifth embodiment of the radome for vehicles according to the present invention.

In the following, a fifth embodiment is described with reference to FIG. 13. In the fifth embodiment, identical reference numerals are given to the components that are quite similar to the corresponding components of the first embodiment and redundant description is omitted therein. Reference numerals **5\*\***, which are obtained by adding 500 to the reference numerals of the components of the first embodiment, are given to the components that correspond to the components of the first embodiment or are assigned to components with some specific characteristic corresponding to fifth embodiment.

In this fifth embodiment, the bright decorative element 6, as described on FIG. 4, is also positioned on the distal face of the set consisting of front radio transmissive transparent layer 9 and radio transmissive colored layer 5. In this case, the bright decorative element 6 may cover totally or partially the distal face of the mentioned set.

In case of severe mechanical or corrosion requirements, a hard coating consisting of a varnish may be applied on the proximal and or distal faces of the set of layers described until now, as already well known in the state of the art.

The radome described in fourth embodiment comprises some internal light sources 11 that can take the form of LEDs or any other suitable light source in terms of intensity and color. The light emitted by the internal light sources 11 is introduced into and guided by an internal light guide 12. The projected light 514 crosses the bright decorative element 6 through some gaps 15 existing on it, the translucent zones 52 of the radio transmissive colored layer 5 and the radio transmissive transparent layer 9. The present embodiment uses a bright decorative element 6 with an opacity element 63 with a number of metalloid layers (6311 to 63*n*2, with n up to 6) that is enough to avoid that the high luminosity of the internal light sources 11 cannot be seen by an external observer.

The rear opaque cover 510 is positioned on the side of the radome facing towards the radar. It includes the fixations 8, located out of field of view area 7.

The thickness of each plastic layer may vary within the field of view area 7 but the total thickness of the group of plastic layers is adapted to the mill metric wave semi wavelength, resulting in a lower attenuation for the radar waves.

Embodiment 6

Figure 14:
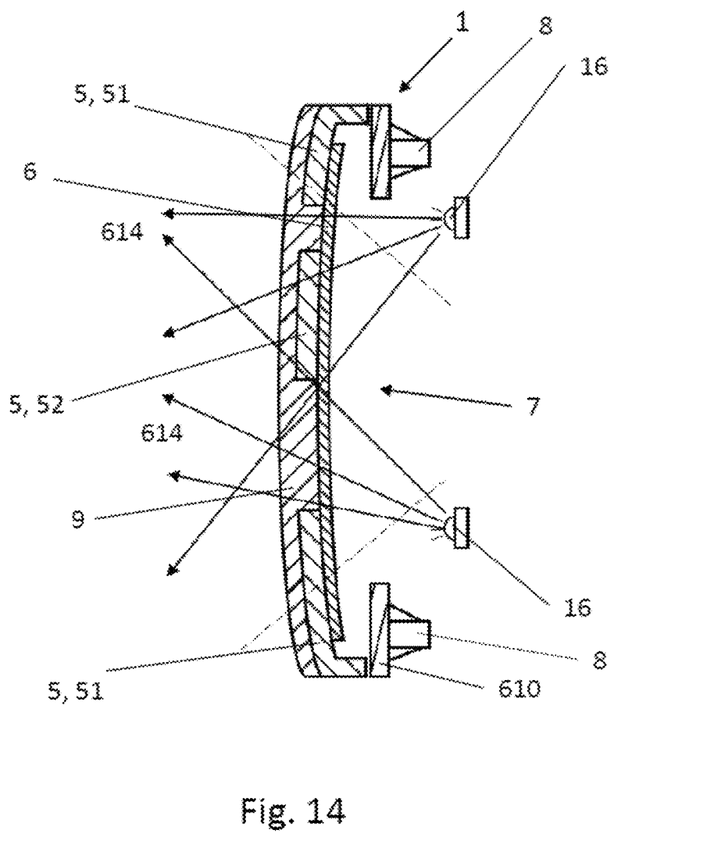
FIG. 14 shows a sixth embodiment of the radome for vehicles according to the present invention.

In the following, a sixth embodiment is described with reference to FIG. 14. In the sixth embodiment, identical reference numerals are given to the components that are quite similar to the corresponding components of the first embodiment and redundant description is omitted therein. Reference numerals **6\*\***, which are obtained by adding 600 to the reference numerals of the components of the first embodiment, are given to the components that correspond to the components of the first embodiment or are assigned to components with some specific characteristic corresponding to sixth embodiment.

In this sixth embodiment, the bright decorative element 6, as described on FIG. 4, is also positioned on the distal face of the set consisting of front radio transmissive transparent layer 9 and radio transmissive opaque layer 5. In this case, the bright decorative element 6 may cover totally or partially the distal face of the mentioned set.

In case of severe mechanical or corrosion requirements, a hard coating consisting of a varnish may be applied on the proximal and or distal faces of the set of layers described until now, as already well known in the state of the art.

The radome described in sixth embodiment has the bright decorative element 6 positioned in front of some external light sources 16, not included in the radome, that can take the form of LEDs or any other suitable light source in terms of intensity and color. They project light towards the distal face of the radome. The projected light 614 crosses the bright decorative element 6, the translucent zones 52 of the radio transmissive colored layer 5 and the radio transmissive transparent layer 9. This is possible because the present embodiment uses a bright decorative element 6 with no opacity element 63, having a translucent behavior.

The rear cover 610 is positioned on the side of the radome facing towards the radar. It includes the fixations 8, located out of field of view area 7.

The thickness of each plastic layer may vary within the field of view area 7 but the total thickness of the group of plastic layers is adapted to the mill metric wave semi wavelength, resulting in a lower attenuation for the radar waves.

Embodiment 7

Figure 15:
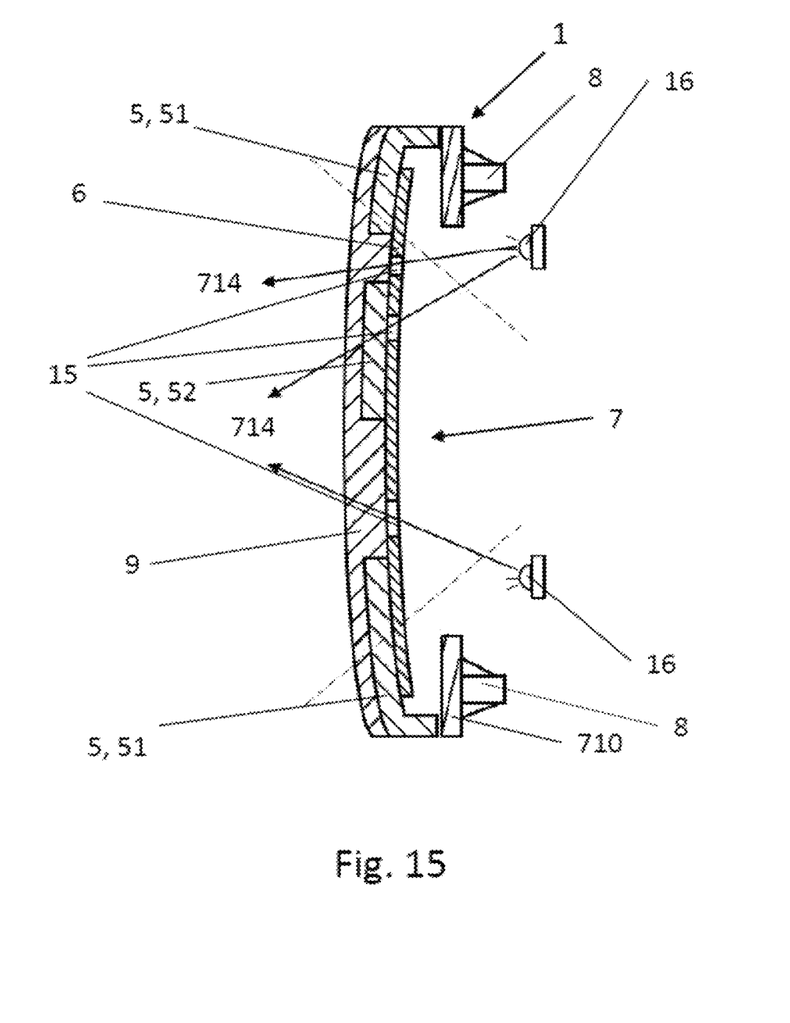
FIG. 15 shows a seventh embodiment of the radome for vehicles according to the present invention.

In the following, a seventh embodiment is described with reference to FIG. 15. In the seventh embodiment, identical reference numerals are given to the components that are quite similar to the corresponding components of the first embodiment and redundant description is omitted therein. Reference numerals **7\*\***, which are obtained by adding 700 to the reference numerals of the components of the first embodiment, are given to the components that correspond to the components of the first embodiment or are assigned to components with some specific characteristic corresponding to seventh embodiment.

In this seventh embodiment, the bright decorative element 6, as described on FIG. 4, is also positioned on the distal face of the set consisting of front radio transmissive transparent layer 9 and radio transmissive opaque layer 5. In this case, the bright decorative element 6 may cover totally or partially the distal face of the mentioned set.

In case of severe mechanical or corrosion requirements, a hard coating consisting of a varnish may be applied on the proximal and or distal faces of set of layers described until now, as already well known in the state of the art.

The radome described in seventh embodiment has the bright decorative element 6 positioned in front of some external light sources 16, not included in the radome, that can take the form of LEDs or any other suitable light source in terms of intensity and color. They project light towards the distal face of the radome. The projected light 714 crosses the bright decorative element 6 through some gaps 15 existing on it, the translucent zones 52 of the radio transmissive colored layer 5 and the radio transmissive transparent layer 9. The present embodiment uses a bright decorative element 6 with an opacity element 63 with a number of metalloid layers (6311 to 63*n*2, with n up to 6) that is enough to avoid that the high luminosity of the internal light sources 11 cannot be seen by an external observer.

The rear cover 10 is positioned on the side of the radome facing towards the radar. It includes the fixations 8, located out of field of view area 7.

The thickness of each plastic layer may vary within the field of view area 7 but the total thickness of the group of plastic layers is adapted to the mill metric wave semi wavelength, resulting in a lower attenuation for the radar waves.

Even though reference has been made to a specific embodiment of the invention, it is obvious for a person skilled in the art that the radome for vehicles described herein is susceptible to numerous variations and modifications, and that all of the details mentioned can be substituted for other technically equivalent ones without departing from the scope of protection defined by the attached claims.

The invention claimed is:

1. Radome for vehicles, comprising a radio transmissive transparent layer (9) and a decorative element (6), characterized in that the decorative element (6) comprises a brightness and tone element (62) consisting of a metal layer (621) and one or more pure metalloid layers (622).

2. Radome for vehicles according to claim 1, wherein the brightness and tone element (62) comprises two metalloid layers (622, 623), each metalloid layer being made from a different metalloid.

3. Radome for vehicles according to claim 1, wherein the decorative element (6) also comprises an opacity element (63) comprising one or more metalloid layers (6311, 6312, 63n1, 63n2).

4. Radome for vehicles according to claim 3, wherein the opacity element (63) comprises from one to twelve metalloid layers (6311, 6312, 63n1, 63n2).

5. Radome for vehicles according to claim 3, wherein the opacity element (63) comprises more than one metalloid layers (6311, 6312, 63n1, 63n2), and the metalloid of one metalloid layer is different from the metalloid of the adjacent metalloid layer(s).

6. Radome for vehicles according to claim 1, wherein the metal layer (621) is made from indium.

7. Radome for vehicles according to claim 1, wherein the one or more metalloid layers are at least one of germanium or silicon.

8. Radome for vehicles according to claim 1, wherein metal layer (621) has a thickness between 5-50 nm.

9. Radome for vehicles according to claim 1, wherein the one or more metalloid layers (622, 623) of the brightness and tone element (62) have a thickness between 4-100 nm.

10. Radome for vehicles according to claim 1, wherein the one or more metalloid layers (631, 632, 6n1, 6n2) of the opacity element (63) have a thickness between 4-250 nm.

11. Radome for vehicles according to claim 1, wherein the decorative element (6) comprises a transparent primer layer (61) placed in a proximal end of the decorative element (6).

12. Radome for vehicles according to claim 1, wherein the decorative element (6) comprises a protection layer (64) placed in a distal end of the decorative element (6).

13. Radome for vehicles according to claim 1, wherein the radome also comprises a radio transmissive colored layer (5), comprising opaque and/or translucent zones (51, 52), the radio transmissive colored layer (5) being placed between the radio transmissive transparent layer (9) and the decorative element (6).

14. Radome for vehicles according to claim 1, wherein the decorative element (6) comprises a plurality of gaps (15) for the passage of light.

15. Radome for vehicles according to claim 1, wherein the radome also comprises at least one light source (11) and a light guide (12).

* * * * *